(12) United States Patent (10) Patent No.: US 8,505,994 B2
Park et al. (45) Date of Patent: Aug. 13, 2013

(54) OVERHEAD CONSOLE OF VEHICLE

(75) Inventors: Jong Bae Park, Seoul (KR); June Soo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 13/323,304

(22) Filed: Dec. 12, 2011

(65) Prior Publication Data

US 2013/0113231 A1 May 9, 2013

(30) Foreign Application Priority Data

Nov. 4, 2011 (KR) ........................ 10-2011-0114695

(51) Int. Cl.
*B60R 13/00* (2006.01)

(52) U.S. Cl.
USPC ...................................................... 296/24.34

(58) Field of Classification Search
USPC ............ 296/24.34, 214, 37.7, 37.8; 224/311; 340/425.5, 438, 461, 525; 701/1, 36; 362/494; 313/501; 348/148
See application file for complete search history.

(56) References Cited

U.S. PATENT DOCUMENTS

| | | | | |
|---|---|---|---|---|
| 4,867,498 A | * | 9/1989 | Delphia et al. | 296/37.7 |
| 5,522,638 A | * | 6/1996 | Falcoff et al. | 296/37.8 |
| 5,651,605 A | * | 7/1997 | Corn | 362/492 |
| 5,940,120 A | * | 8/1999 | Frankhouse et al. | 348/61 |
| 6,003,925 A | * | 12/1999 | Litke et al. | 296/37.8 |
| 6,062,623 A | * | 5/2000 | Lemmen | 296/37.8 |
| 6,116,675 A | * | 9/2000 | Iwasawa | 296/37.8 |
| 6,125,030 A | * | 9/2000 | Mola et al. | 361/679.56 |
| 6,126,221 A | * | 10/2000 | Kern | 296/37.7 |
| 6,135,528 A | * | 10/2000 | Sobieski et al. | 296/37.7 |
| 6,338,517 B1 | * | 1/2002 | Canni et al. | 296/37.8 |
| 7,021,728 B2 | * | 4/2006 | Donovan et al. | 312/7.2 |
| 7,055,883 B2 | * | 6/2006 | Tokutomi et al. | 296/37.8 |
| 7,380,852 B2 | * | 6/2008 | Vander Kuyl et al. | 296/24.34 |
| 8,157,314 B2 | * | 4/2012 | Gwon | 296/37.7 |
| 2006/0113810 A1 | * | 6/2006 | Kuhl et al. | 296/24.34 |

FOREIGN PATENT DOCUMENTS

| | | |
|---|---|---|
| KR | 20-0334288 Y1 | 11/2003 |
| KR | 1020060062048 A | 6/2006 |
| KR | 100867255 B1 | 10/2008 |
| KR | 1020100129581 A | 12/2010 |

* cited by examiner

*Primary Examiner* — Kiran B Patel
(74) *Attorney, Agent, or Firm* — Morgan, Lewis & Bockius LLP (57) ABSTRACT

An overhead console of the vehicle may include a housing provided on a front portion of an indoor ceiling of the vehicle and having a downwardly open accommodation portion formed therein, a glass case accommodated in the accommodation portion and rotatably coupled to the housing around a rotating shaft that may be formed on a front side surface of the housing in a traverse direction of the vehicle, and a conversation mirror rotatably coupled with the housing in the accommodation portion and selectively engaged with a rear portion of the glass case.

9 Claims, 8 Drawing Sheets

OVERHEAD CONSOLE OF VEHICLE

CROSS-REFERENCE TO RELATED APPLICATION

The present application claims priority to Korean Patent Application No.10-2011-0114695, filed on Nov. 4, 2011 in the Korean Intellectual Property Office, the entire contents of which is incorporated herein for all purposes by this reference.

BACKGROUND OF THE INVENTION

1. Field of the invention

The present invention relates to an overhead console of a vehicle, and more particularly, to an overhead console of a vehicle which can be implemented with compact size through mounting of a conversation mirror inside a glass case.

2. Description of Related Art

In general, a sport utility van or a wagon, which is a leisure vehicle, has a wide interior and carries a large number of passengers, and a conversation mirror through which a driver can monitor the indoor of the vehicle is installed in the vehicle as an optional feature.

The conversation mirror is installed in a front portion of the vehicle, which a driver's eye can easily meet, and thus the driver can look at rear seats through the conversation mirror at any time during driving.

In order to heighten the space utility of a vehicle, it is general that the conversation mirror is installed so that the conversation mirror can be accommodated in an overhead console that is installed on a front portion of an indoor ceiling of the vehicle.

However, in the case where the conversation mirror is installed in the overhead console, in which a glass case and an indoor lamp are also installed in addition to the conversation mirror, the volume of the overhead console is increased and thus the space utility is degraded.

If an overhead console includes a conversation mirror and thus the size of the overhead console becomes large, a vehicle having a sun roof that is installed on the ceiling of the vehicle must unavoidably use an overhead console that does not include a conversation mirror. Even if an overhead console that includes a conversation mirror is used in a vehicle having a sun roof, the position in which the sun roof is installed should move toward the rear seat in comparison to the existing sun roof installation position due to the large size of the overhead console, and thus it is difficult to properly install the sun roof.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an overhead console of a vehicle which can be implemented with compact size through mounting of a conversation mirror inside a glass case.

In an aspect of the present invention, an overhead console of the vehicle may include a housing provided on a front portion of an indoor ceiling of the vehicle and having a downwardly open accommodation portion formed therein, a glass case accommodated in the accommodation portion and rotatably coupled to the housing around a rotating shaft that is formed on a front side surface of the housing in a traverse direction of the vehicle, and a conversation mirror rotatably coupled with the housing in the accommodation portion and selectively engaged with a rear portion of the glass case.

A first guide protrusion is formed on a side surface of the glass case to project toward an inner side surface of the housing, and a first guide slot having an arc shape is formed on the inner side surface of the housing to receive and guide the first guide protrusion.

A second guide protrusion is formed on at least a side surface of the conversation mirror to project toward an inner side surface of the housing, and a second guide slot having an arc shape is formed on the inner side surface of the housing to receive and guide the second guide protrusion.

A gear is formed on the other side surface of the glass case, and a damper, which is tooth-engaged with the gear to deter the glass case from being quickly opened by gravity, is installed on the inside of the accommodation portion.

A maximum opening angle when the conversation mirror and the glass case are integrally opened is smaller than a maximum opening angle when only the glass case is opened independently of the conversation mirror.

The overhead console of the vehicle may further include a spring put around the rotating shaft and having one end that is fixed to the glass case and the other end that is fixed to the housing to transfer force in an opening direction of the glass case when the glass case is opened.

A first latch is provided inside the accommodation portion to be fitted with a first hook piece that is formed at an upper end of the glass case when the glass case is closed to prevent the glass case from dropping.

A second latch is provided inside the accommodation portion to be fitted with a second hook piece that is formed at an upper end of the conversation mirror when the conversation mirror is closed to prevent the conversation mirror from dropping.

The conversation mirror may include a projection piece to which a locking finger of a switch that is slidably coupled to the glass case is selectively engaged by operation of the switch.

As described above, according to the present invention, by mounting the conversation mirror inside the glass case, the overhead console of a vehicle can be implemented with compact size.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a preferred embodiment of the present invention will be described in detail with reference to the accompanying drawings.

Figure 1:
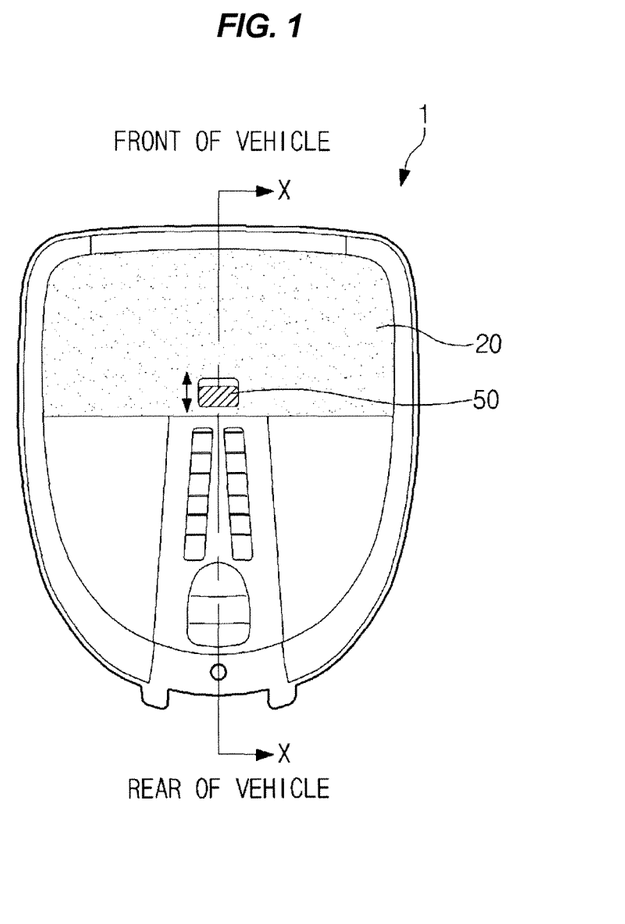
FIG. 1 is a bottom view illustrating an overhead console of a vehicle according to an exemplary embodiment of the present invention.
Figure 2:
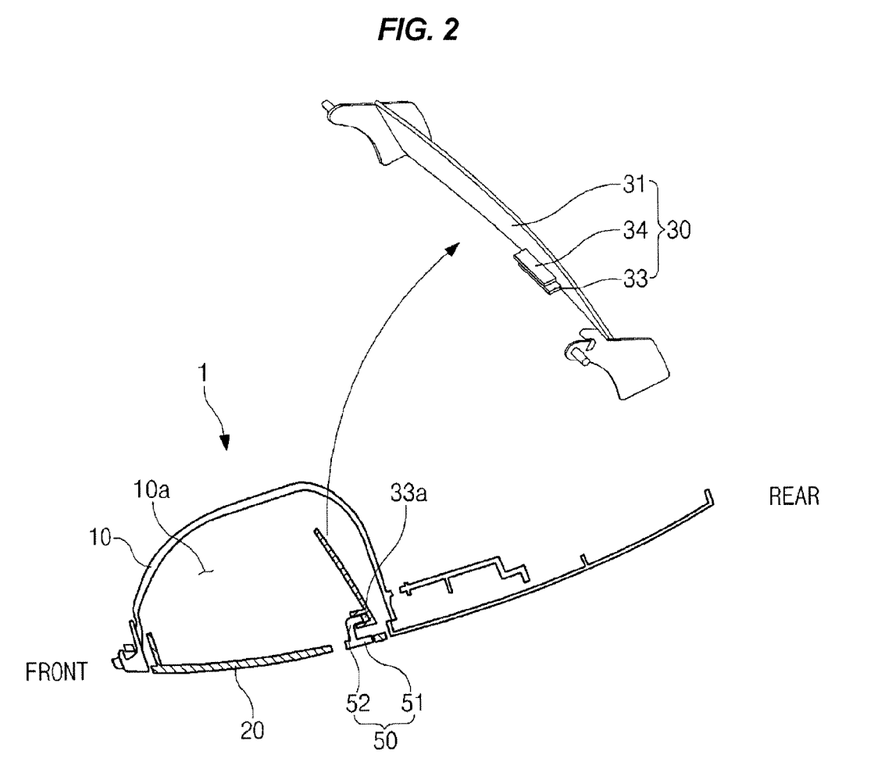
FIG. 2 is a cross-section view taken along line X-X of FIG. 1.
Figure 3:
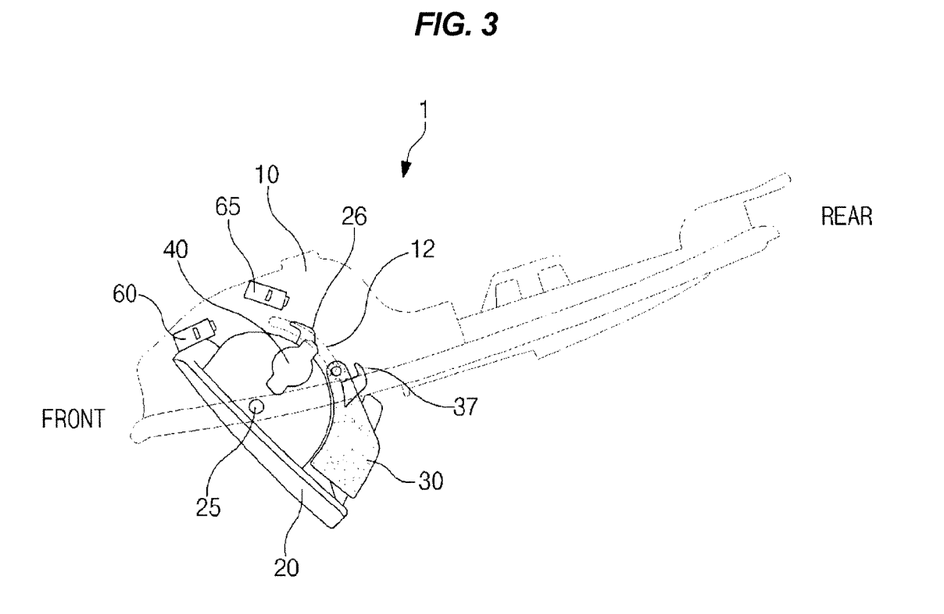
FIGS. 3 and 4 are side views illustrating a conversation mirror and a glass case which are in an integrally open state in an overhead console of a vehicle according to an exemplary embodiment of the present invention.
Figure 4:
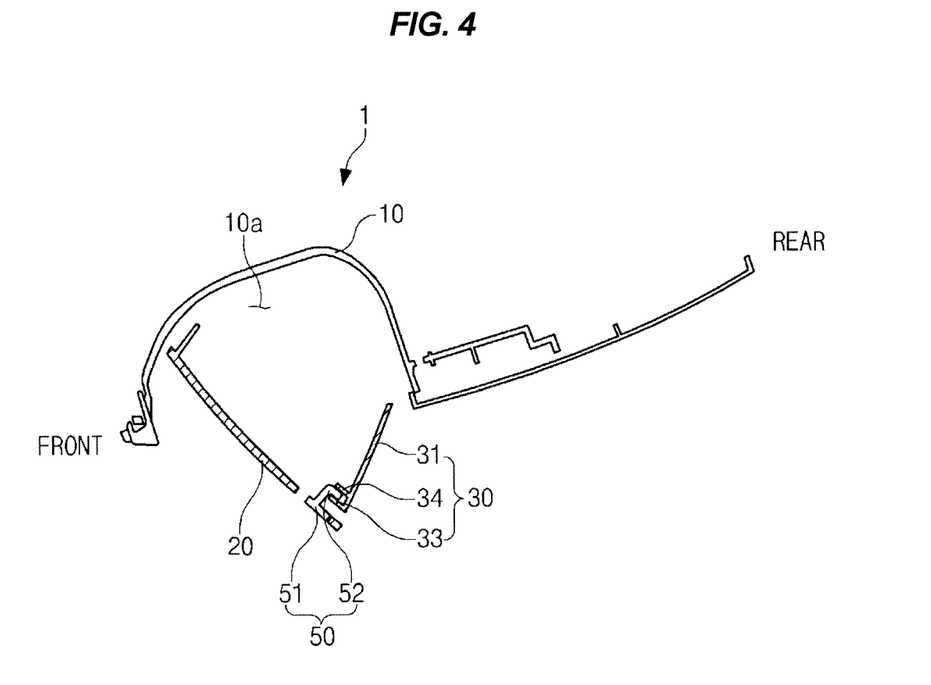
Figure 5:
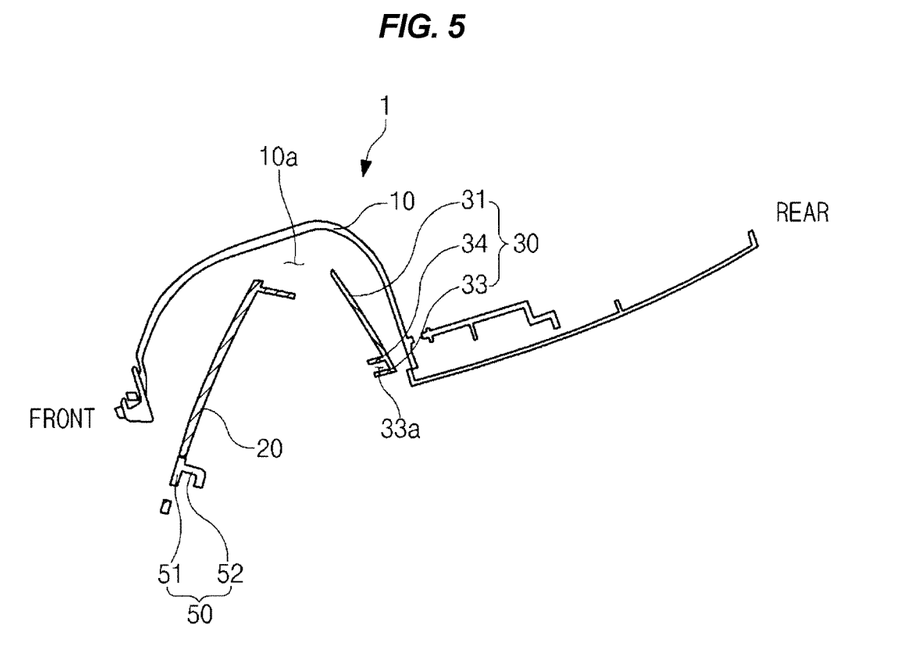
FIGS. 5 and 6 are side views illustrating a case in which only a glass case is opened independently of a conversation mirror in FIG. 4.
Figure 6:
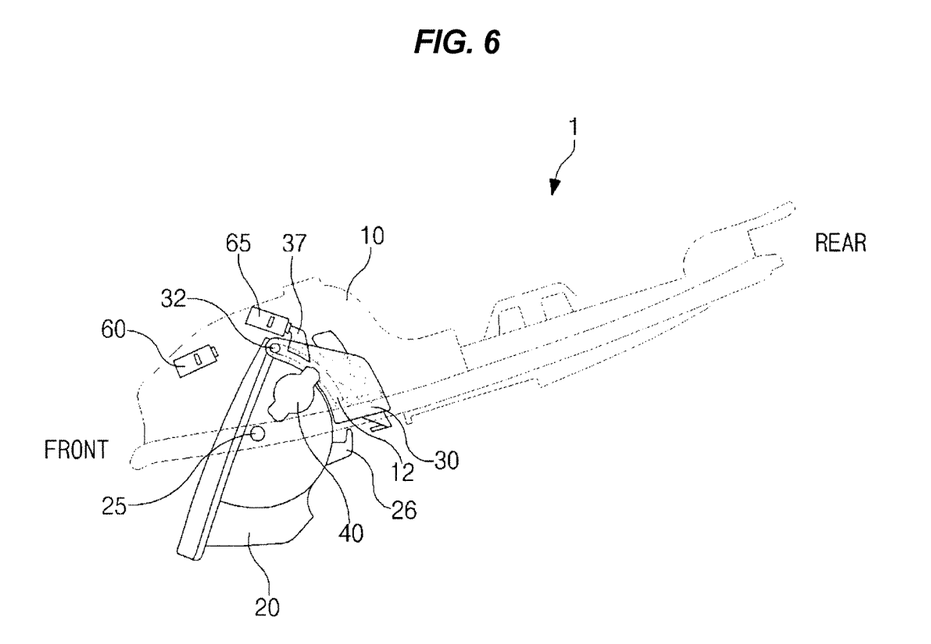

FIG. 1 is a bottom view illustrating an overhead console of a vehicle according to an exemplary embodiment of the present invention, and FIG. 2 is a cross-section view taken along line X-X of FIG. 1. FIGS. 3 and 4 are side views illustrating a conversation mirror and a glass case which are in an integrally open state in an overhead console of a vehicle according to an exemplary embodiment of the present invention, and FIGS. 5 and 6 are side views illustrating a case in which only a glass case is opened independently of a conversation mirror in FIG. 4.

An overhead console of a vehicle according to an exemplary embodiment of the present invention, as illustrated in FIGS. 1 to 6, includes a housing 10, a glass case 20 and a conversation mirror 30, which are accommodated in the housing 10.

The housing 10 is provided in the length direction on a front portion of an indoor ceiling of the vehicle, and a downwardly open accommodation portion 10a is inwardly formed on a front portion of the housing 10 to accommodate the glass case 20 and the conversation mirror 30 therein.

The glass case 20 is accommodated in the accommodation portion 10a, and the conversation mirror 30 is accommodated in a rear portion of the inside of the glass case 20. As described above, since the glass case 20 and the conversation mirror 30 are not serially arranged in the length direction of the vehicle ceiling, but the conversation mirror 30 is accommodated inside the glass case 20, the overhead console 1 can be implemented with compact size.

Here, the glass case 20 is rotatably coupled to the housing 10 round a rotating shaft that is formed to project from the front side surface of the glass case 20 in the horizontal direction.

Figure 7:
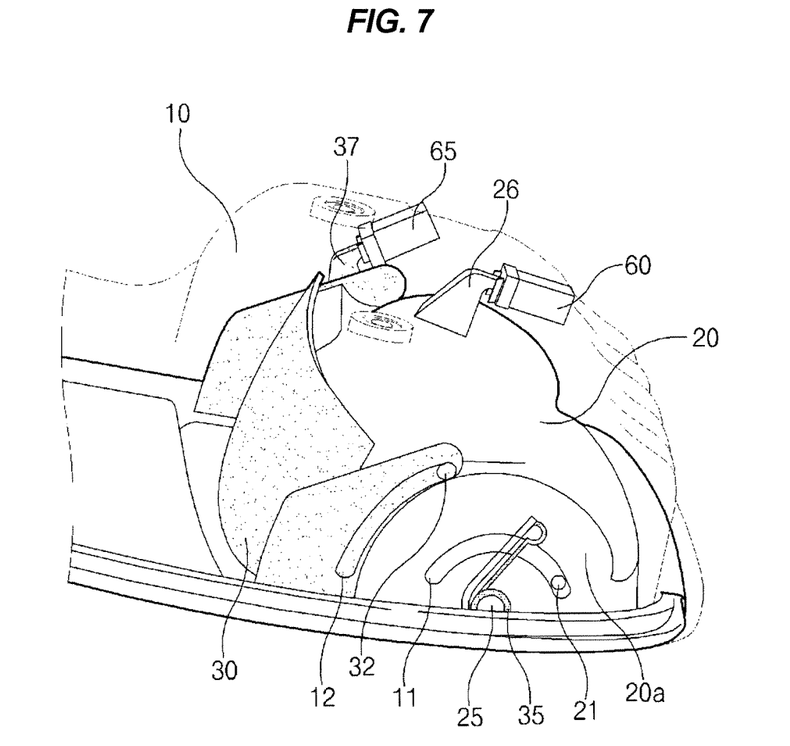
FIG. 7 is a perspective view of an overhead console of a vehicle as seen from one side surface of a glass case according to an exemplary embodiment of the present invention.

As illustrated in FIG. 7, a spring 35 is mounted round the rotating shaft 25 to transfer force in the opening direction of the glass case 20 when the glass case 20 is opened. For this, one end of the spring 35 is fixed to the glass case 20, and the other end thereof is fixed to the housing 10.

On one side surface 20a of the glass case 20, a first guide protrusion 21 is formed to project toward the inner side surface of the housing 10, and on the inner side surface of the housing 10, a first guide slot 11 having an arc shape is formed to guide the first guide protrusion 21. Accordingly, when the glass case 20 is opened and closed round the rotating shaft 25, the first guide protrusion 21 is guided along the first guide slot 11 to achieve a smooth opening and closing operation of the glass case 20.

In this case, the rotating radius of the glass case 20 is determined by the length of the arc of the first guide slot 11.

Figure 8:
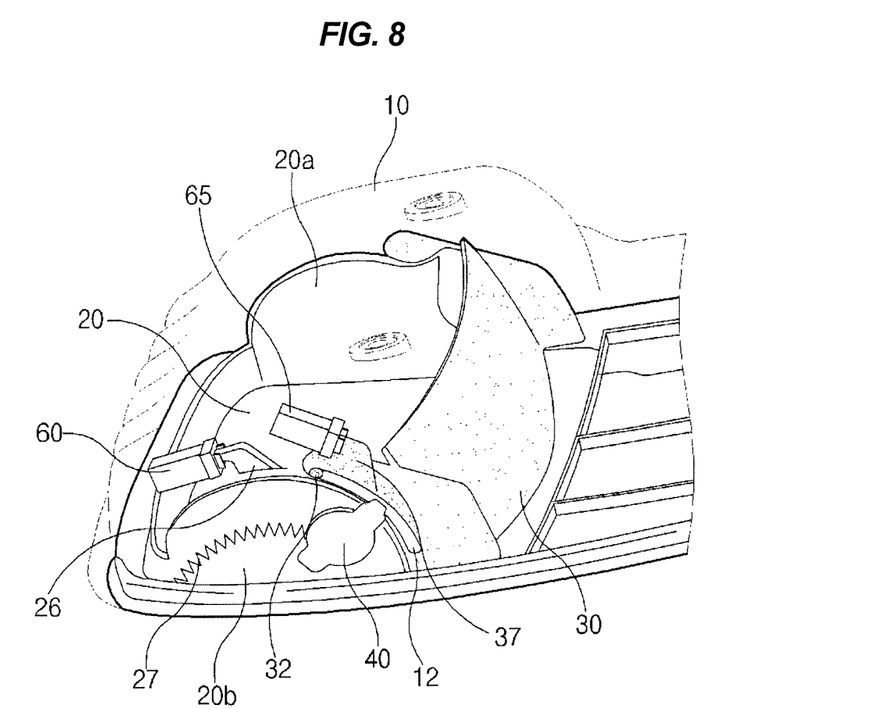
FIG. 8 is a perspective view of an overhead console of a vehicle as seen from the other side surface of a glass case according to an exemplary embodiment of the present invention.

As illustrated in FIG. 8, a gear 27 is formed on the other side surface 20b of the glass case 20, and is tooth-engaged with a damper 40 that is provided inside the accommodation portion 10a. Accordingly, the gear 27 is opened in a state where the gear 27 is engaged with the damper 40 when the glass case 20 is opened, and thus the glass case 20 is deterred from being quickly opened by gravity.

On the other hand, a first latch 60 is provided inside the accommodation portion 10a to be fitted with a first hook piece 26 that is formed at an upper end of the glass case 20 when the glass case 20 is closed, and thus the glass case 20 is prevented from dropping.

The conversation mirror 30 is accommodated in the rear portion of the inside of the glass case 20, and the driver can look at rear seats through the conversation mirror 30 at any time during driving.

The conversation mirror 30 is constructed to be integrally coupled to or to be separated from the glass case 20 by the operation of the glass case 20, and includes a main body 31 extended in a vehicle width direction, and projection pieces 33 and 34 which project from the main body 31 to the front and are spaced apart from each other in upward and downward directions to form a protrusion accommodation portion 33a.

Here, on both side surfaces of the conversation mirror 30, a second guide protrusion 32 is formed to project toward the inner side surface of the housing 10. A switch 50 including a slider 51 and a locking finger 52 is installed on the glass case 50 such that when a user moves the switch 50 in a direction, the locking finger 52 engaged with the projection pieces 33 and 34 of the conversation mirror 30 is disengaged therefrom. Accordingly, the glass case 34 can rotate further downwards from the conversation mirror 30 as shown in FIG. 5 to open the glass case 20.

On the inner side surface of the housing 10, a second guide slot 12 having an arc shape is formed to guide the second guide protrusion 32. Accordingly, the second guide protrusion 32 is guided along the second guide slot 12 to achieve a smooth opening and closing operation of the conversation mirror 30.

In this case, the rotating radius of the conversation mirror 30 is determined by the length of the arc of the second guide slot 12.

In this embodiment, it is preferable that the maximum opening angle when the conversation mirror 30 and the glass case 20 are integrally opened is smaller than the maximum opening angle when only the glass case 20 is opened independently of the conversation mirror 30. That is, in the case of opening the conversation mirror 30 and the glass case 20 integrally, it is preferable to maximally open the conversation mirror 30 and the glass case 20 at an angle at which the driver can see the rear seats well (see FIG. 4), and in the case of opening only the glass case 20, it is preferable to further open the glass case 20 over the opening angle of the conversation mirror 30 so that the driver can use the glass case 20 more conveniently (see FIG. 5).

On the other hand, a second latch 65 is provided inside the accommodation portion 10*a* to be fitted with a second hook piece 37 that is formed at an upper end of the conversation mirror 30 when the conversation mirror is closed to prevent the conversation mirror 30 from dropping.

As described above, according to an exemplary embodiment of the present invention, by mounting the conversation mirror 30 inside the glass case 20, the overhead console of a vehicle can be implemented with compact size.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. An overhead console of the vehicle comprising:
   a housing provided on a front portion of an indoor ceiling of the vehicle and having a downwardly open accommodation portion formed therein;
   a glass case accommodated in the accommodation portion and rotatably coupled to the housing around a rotating shaft that is formed on a front side surface of the housing in a traverse direction of the vehicle; and
   a conversation mirror rotatably coupled with the housing in the accommodation portion and selectively engaged with a rear portion of the glass case.

2. The overhead console of the vehicle according to claim 1, wherein a first guide protrusion is formed on a side surface of the glass case to project toward an inner side surface of the housing, and a first guide slot having an arc shape is formed on the inner side surface of the housing to receive and guide the first guide protrusion.

3. The overhead console of the vehicle according to claim 2, wherein a second guide protrusion is formed on at least a side surface of the conversation mirror to project toward an inner side surface of the housing, and a second guide slot having an arc shape is formed on the inner side surface of the housing to receive and guide the second guide protrusion.

4. The overhead console of the vehicle according to claim 2, wherein a gear is formed on the other side surface of the glass case, and a damper, which is tooth-engaged with the gear to deter the glass case from being quickly opened by gravity, is installed on the inside of the accommodation portion.

5. The overhead console of the vehicle according to claim 1, wherein a maximum opening angle when the conversation mirror and the glass case are integrally opened is smaller than a maximum opening angle when only the glass case is opened independently of the conversation mirror.

6. The overhead console of the vehicle according to claim 1, further comprising a spring put around the rotating shaft and having one end that is fixed to the glass case and the other end that is fixed to the housing to transfer force in an opening direction of the glass case when the glass case is opened.

7. The overhead console of the vehicle according to claim 1, wherein a first latch is provided inside the accommodation portion to be fitted with a first hook piece that is formed at an upper end of the glass case when the glass case is closed to prevent the glass case from dropping.

8. The overhead console of the vehicle according to claim 1, wherein a second latch is provided inside the accommodation portion to be fitted with a second hook piece that is formed at an upper end of the conversation mirror when the conversation mirror is closed to prevent the conversation mirror from dropping.

9. The overhead console of the vehicle according to claim 1, wherein the conversation mirror includes a projection piece to which a locking finger of a switch that is slidably coupled to the glass case is selectively engaged by operation of the switch.

\* \* \* \* \*